United States Patent [19]
Sangregory

[11] Patent Number: 6,014,527
[45] Date of Patent: Jan. 11, 2000

[54] CAMERA WITH CLOSING LEVER PIVOTALLY SUPPORTED ON CASSETTE TO CLOSE CASSETTE

[75] Inventor: Jude A. Sangregory, Spencerport, N.Y.

[73] Assignee: Eastman Kodak Company, Rochester, N.Y.

[21] Appl. No.: 09/243,661

[22] Filed: Feb. 3, 1999

[51] Int. Cl.$^7$ .................................................. G03B 17/24
[52] U.S. Cl. .......................................................... 396/538
[58] Field of Search ................................ 396/6, 513, 516, 396/538

[56] References Cited

U.S. PATENT DOCUMENTS

| | | |
|---|---|---|
| 5,550,608 | 8/1996 | Smart et al. . |
| 5,555,063 | 9/1996 | Balling . |
| 5,579,070 | 11/1996 | Smart et al. . |
| 5,600,395 | 2/1997 | Balling et al . |
| 5,602,609 | 2/1997 | Balling . |
| 5,608,480 | 3/1997 | Smart et al. . |
| 5,614,976 | 3/1997 | Smart et al. . |
| 5,617,169 | 4/1997 | Takaba et al. . |
| 5,629,750 | 5/1997 | Smart et al. . |
| 5,708,854 | 1/1998 | Smart et al. . |
| 5,727,247 | 3/1998 | Smart et al. . |
| 5,748,989 | 5/1998 | Sangregory et al. . |
| 5,748,990 | 5/1998 | Smart et al. . |

FOREIGN PATENT DOCUMENTS

| | | |
|---|---|---|
| 8-201987 | 8/1996 | Japan . |
| 8-201990 | 8/1996 | Japan . |
| 8-254792 | 10/1996 | Japan . |

*Primary Examiner*—David M. Gray
*Attorney, Agent, or Firm*—Roger A. Fields

[57] ABSTRACT

A camera comprising a chamber for a film cassette having a light lock that is to be closed when an exposed filmstrip is completely moved into the cassette, and a movable closing mechanism for closing the light lock, is characterized in that the closing mechanism has a closing lever with a pivot support configured on the closing lever to engage the film cassette separate from the light lock in order to support the closing lever on the film cassette for pivotal movement to close the light lock.

8 Claims, 10 Drawing Sheets

CAMERA WITH CLOSING LEVER PIVOTALLY SUPPORTED ON CASSETTE TO CLOSE CASSETTE

CROSS REFERENCE TO RELATED APPLICATIONS

Reference is made to commonly assigned copending applications Ser. No. 09/243,861, entitled CAMERA WITH FILM WINDER HAVING SINGLE DUAL-FUNCTION PART FOR WINDING EXPOSED FILMSTRIP INTO CASSETTE AND FOR CLOSING CASSETTE and filed Feb. 3, 1999 in the names of Jude A. San Gregory & Anthony DiRisio, Ser. No. 09/243,864, entitled CAMERA WITH FILM SENSOR TO DETERMINE WHEN TO CLOSE CASSETTE NOT URGED AGAINST FILMSTRIP DURING EXPOSURE and filed Feb. 3, 1999 in the names of Jude A. SanGregory, Anthony DiRisio & Thomas E. Dussinger, Ser. No. 09/243,863, entitled CAMERA WITH CLOSING MECHANISM TO CLOSE CASSETTE and filed Feb. 3, 1999 in the names of Jude A. SanGregory & Douglas A. Pearson, Ser. No. 09/243,865, entitled ONE-TIME-USE CAMERA WITH FILM SENSOR TO DETERMINE WHEN TO CLOSE CASSETTE DISABLED WHEN CASSETTE CLOSED and filed Feb. 3, 1999 in the names of Jude A. SanGregory & Thomas E. Dussinger, and Ser. No. 09/246,316, entitled ONE-TIME-USE CAMERA WITH CLOSING MECHANISM TO CLOSE CASSETTE DISABLED WHEN UNEXPOSED FILM PREWOUND FROM CASSETTE DURING CAMERA MANUFACTURE and filed Feb. 8, 1999 in the name of Thomas E. Dussinger.

FIELD OF THE INVENTION

The invention relates generally to the field of photography, and in particular to cameras such as so-called one-time-use or disposable cameras. More specifically, the invention relates to a camera with a closing mechanism for closing the light lock of a film cassette after an exposed filmstrip is completely moved into the cassette.

BACKGROUND OF THE INVENTION

It is known for a camera to be used with a film cassette having a film spool inside the cassette that is windingly rotated to progressively wind an exposed filmstrip into the cassette following each exposure and a light lock that is to be pivoted closed after the exposed filmstrip is completely wound into the cassette following the last exposure. The light lock must be pivoted closed to prevent ambient light from entering the film cassette when the cassette is removed from the camera.

Commonly assigned U.S. Pat. No 5,608,480 issued March 4, 1997 discloses a camera for use with the film cassette. The camera includes a manually rotatable film winding thumbwheel for windingly rotating the film spool, a film sensor spring-urged against the exposed filmstrip before the exposed filmstrip is completely wound into the cassette to sense the presence of the exposed filmstrip, and a closing mechanism movable to close the light lock when the exposed filmstrip is completely wound into the cassette. The closing mechanism has a depending drive stem located in a drive cavity of the light lock to rotationally engage the light lock in order to pivot the light lock closed.

The Cross-Referenced Applications

The cross-referenced applications are incorporated in this application.

Cross-referenced application Ser. No. 09/243,861, entitled CAMERA WITH FILM WINDER HAVING SINGLE DUAL-FUNCTION PART FOR WINDING EXPOSED FILMSTRIP INTO CASSETTE AND FOR CLOSING CASSETTE discloses a camera comprising a chamber for a film cassette having a film spool inside the cassette that is windingly rotated to progressively wind an exposed filmstrip into the cassette and a light lock that is to be closed after the exposed filmstrip is completely wound into the cassette, a rotatable film winder for windingly rotating the film spool, and a closing mechanism operated to close the light lock, characterized in that the film winder has a single, distinct, dual-function part configured on the film winder to engage the film spool in order to windingly rotate the film spool and to engage the closing mechanism to operate the closing mechanism.

Cross-referenced application Ser. No. 09/243,864, entitled CAMERA WITH FILM SENSOR TO DETERMINE WHEN TO CLOSE CASSETTE NOT URGED AGAINST FILMSTRIP DURING EXPOSURE discloses a camera comprising a chamber for a film cassette having a film spool inside the cassette that is windingly rotated to progressively wind an exposed filmstrip into the cassette and a light lock that is to be closed after the exposed filmstrip is completely wound into the cassette, a rotatable film winder for windingly rotating the film spool, a film sensor urged against the exposed filmstrip before the exposed filmstrip is completely wound into the cassette to sense the presence of the exposed filmstrip, and a closing mechanism movable to close the light lock when the exposed filmstrip is completely wound into the cassette, characterized in that the film winder has an urging component that urges the film sensor against the exposed filmstrip only when the film winder is rotated, whereby the film sensor is not urged against the exposed filmstrip when the film winder is stationary. Thus, the film sensor will not distort the filmstrip during exposure.

Cross-referenced application Ser. No. 09/243,863, entitled CAMERA WITH CLOSING MECHANISM TO CLOSE CASSETTE discloses a camera comprising a chamber for a film cassette having a film passageway through which an exposed filmstrip is progressively moved into the cassette and a light lock that is to be closed within the film passageway after the exposed filmstrip is completely moved into the cassette, and a movable closing mechanism for closing the light lock, characterized in that the closing mechanism has a closing portion configured on the closing mechanism to be moved from outside the film passageway to inside the film passageway when the exposed filmstrip is moved completely into the cassette, in order to close the light lock.

Cross-referenced application Ser. No. 09/243,865, entitled ONE-TIME-USE CAMERA WITH FILM SENSOR TO DETERMINE WHEN TO CLOSE CASSETTE DISABLED WHEN CASSETTE CLOSED discloses a one-time-use camera comprising a film cassette which has a filmstrip that is to be progressively wound into the cassette following each exposure and a light lock that is to be closed after the filmstrip is completely wound into the cassette, and a single-piece closing unit for closing the light lock which has a film sensing portion in contact with the filmstrip as the filmstrip is progressively wound into the cassette to determine when the filmstrip is completely wound into the cassette and a closing portion movable to close the light lock when the film sensing portion determines that the filmstrip is completely would into the cassette, characterized in that a fixed stop is arranged opposite the cassette to form a capture space for the film sensing portion between the fixed stop and the cassette, the film sensing portion is connected to the closing portion at an intermediate weakened portion that is constructed to allow the film sensing portion to be folded towards the closing portion without becoming separated from the closing portion, and the single-piece closing unit is supported for pivotal movement to pivot the closing portion to close the light lock and to pivot the film sensing portion sequentially against the fixed stop and folded into the capture space, whereby the film sensing portion will be trapped in the capture space without being separated from the closing portion to secure the closing portion in place holding the light lock closed.

Cross-referenced application Ser. No. 09/246,316, entitled ONE-TIME-USE CAMERA WITH CLOSING MECHANISM TO CLOSE CASSETTE DISABLED WHEN UNEXPOSED FILM PREWOUND FROM CASSETTE DURING CAMERA MANUFACTURE discloses a one-time-use camera comprising a film cassette with a film spool that is rotated in an unwinding direction during camera manufacture to unwind a filmstrip from the cassette to form an unexposed film roll and in a winding direction during camera use to wind the filmstrip from the unexposed film roll into the cassette and with a light lock that is open when the filmstrip is unwound from the cassette or wound into the cassette and that is otherwise closed, a closing mechanism operable to close the light lock which includes a film sensor, and a film winder rotatable in the winding and unwinding directions when coaxially engaged with the film spool and engageable with the closing mechanism to operate the closing mechanism to close the light lock, characterized in that the closing mechanism has an engageable portion that can be engaged with the film winder to cause rotation of the film winder in the winding direction to urge the film sensor against the filmstrip and a non-engageable portion that cannot be engaged with the film winder, and is supported for movement to position the non-engageable portion against the film winder to prevent the engageable portion from being engaged with the film winder when the film winder is rotated in the unwinding direction, whereby the engageable portion will be protected from becoming worn when the film winder is coaxially engaged with the film spool and rotated in the unwinding direction during camera manufacture.

SUMMARY OF THE INVENTION

According to one aspect of the invention, a camera comprising a chamber for a film cassette having a light lock that is to be closed when an exposed filmstrip is completely moved into the cassette, and a movable closing mechanism for closing the light lock, is characterized in that:

the closing mechanism has a closing lever with a pivot support configured on the closing lever to engage the film cassette separate from the light lock in order to support the closing lever on the film cassette for pivotal movement to close the light lock.

According to another aspect of the invention, a method of assembling a one-time-use camera comprises the steps of:

loading into the camera a film cassette having a light lock that is to be closed when a filmstrip exposed in said camera is completely moved into the cassette; and pivotally engaging a closing lever with the film cassette, without the closing lever engaging the light lock, in order to support the closing lever on the film cassette for pivotal movement relative to the light lock for the closing lever to be pivoted against the light lock to close the light lock.

DETAILED DESCRIPTION OF THE INVENTION

Figure 1:
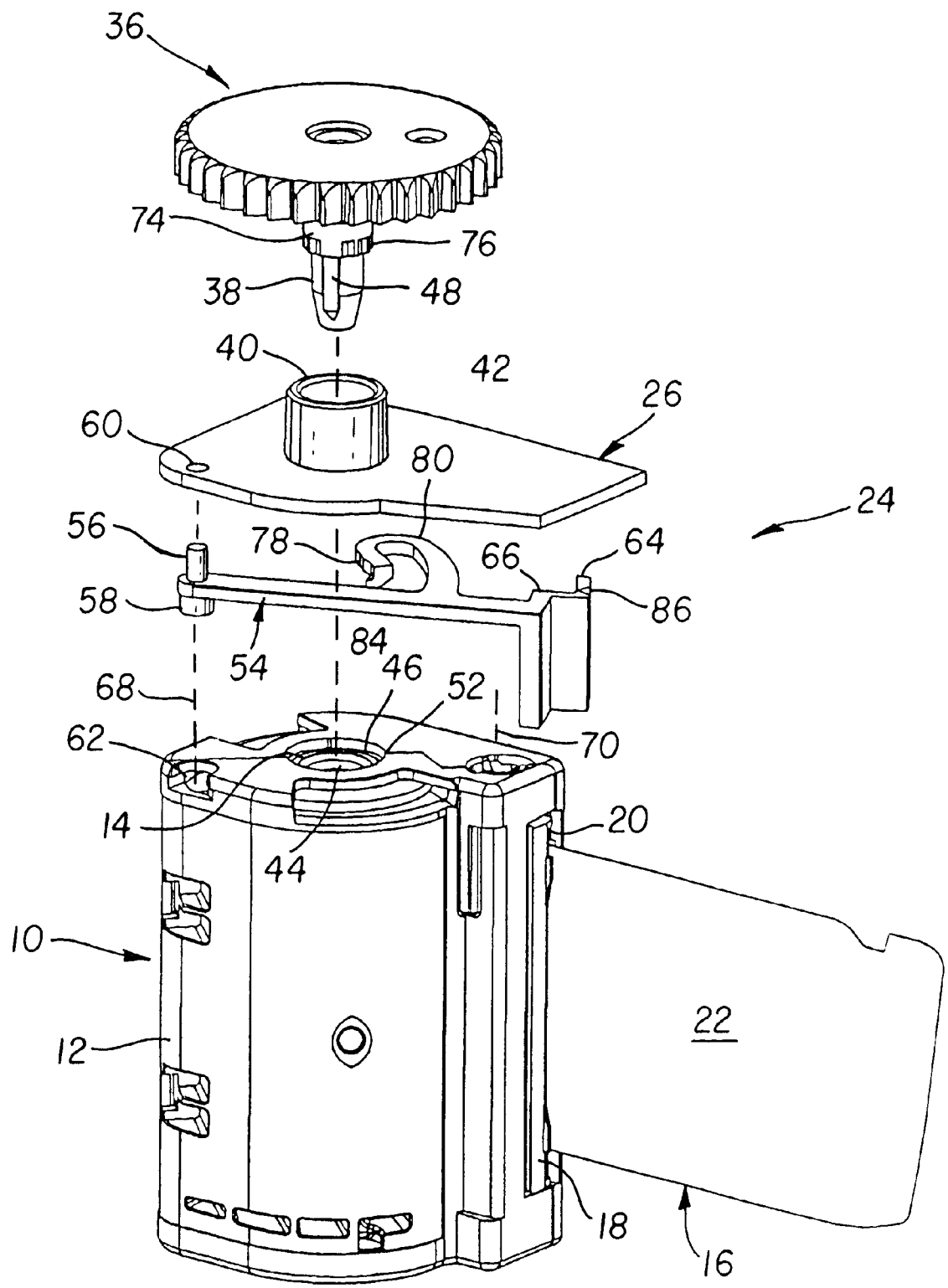
FIG. 1 is a front exploded perspective view partially of a camera such as a so-called one-time-use or disposable camera according to a preferred embodiment of the invention.

The invention is disclosed as being embodied preferably in a camera such as a so-called one-time-use or disposable camera. Because the features of a camera are generally known, the description which follows is directed in particular only to those elements forming part of or cooperating directly with the disclosed embodiment. It is to be understood, however, that other elements may take various forms known to a person of ordinary skill in the art.

Film Cassette

Referring now to the drawings, FIGS. 1, 2, 6 and 10 show a known film cassette 10 similar in operation to ones disclosed in U.S. Pat. No. 5,537,303 issued Oct. 18, 1984, and U.S. Pat. No. 5,231,438 issued Jul. 27, 1993. The film cassette 10 has a cassette shell 12 that contains a rotatable film spool 14 on which is stored a wound unexposed/exposed filmstrip 16. A pivotable light lock 18 inside the cassette shell 12 is pivoted open within a film egress/ingress passageway 20 in the shell to permit film movement out of and back into the shell, through the passageway, and is pivoted closed within the passageway to prevent ambient light from entering the shell, through the passageway.

Figure 2:
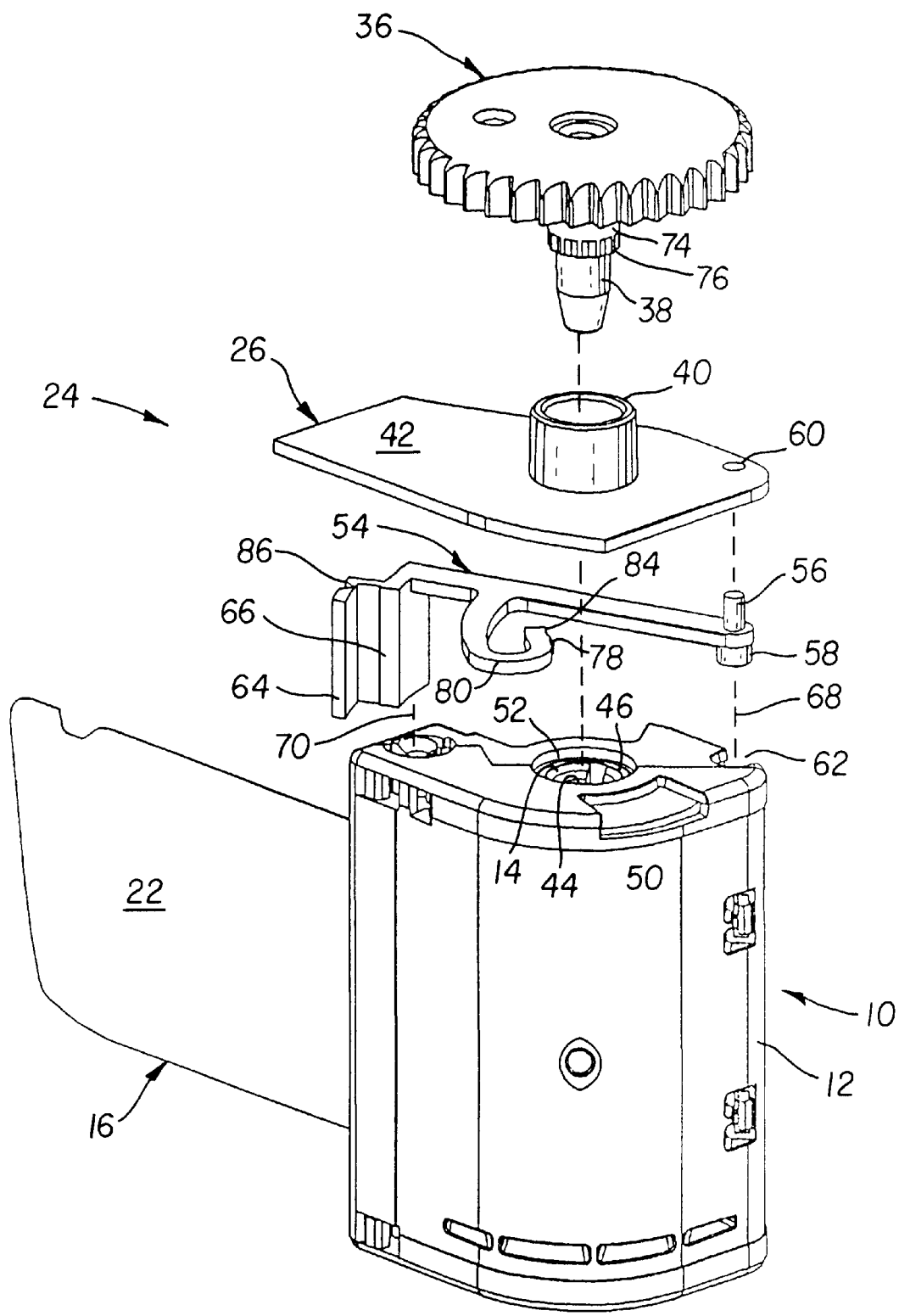
FIG. 2 is a rear exploded perspective view partially of the camera as shown in FIG. 1.
Figure 3:
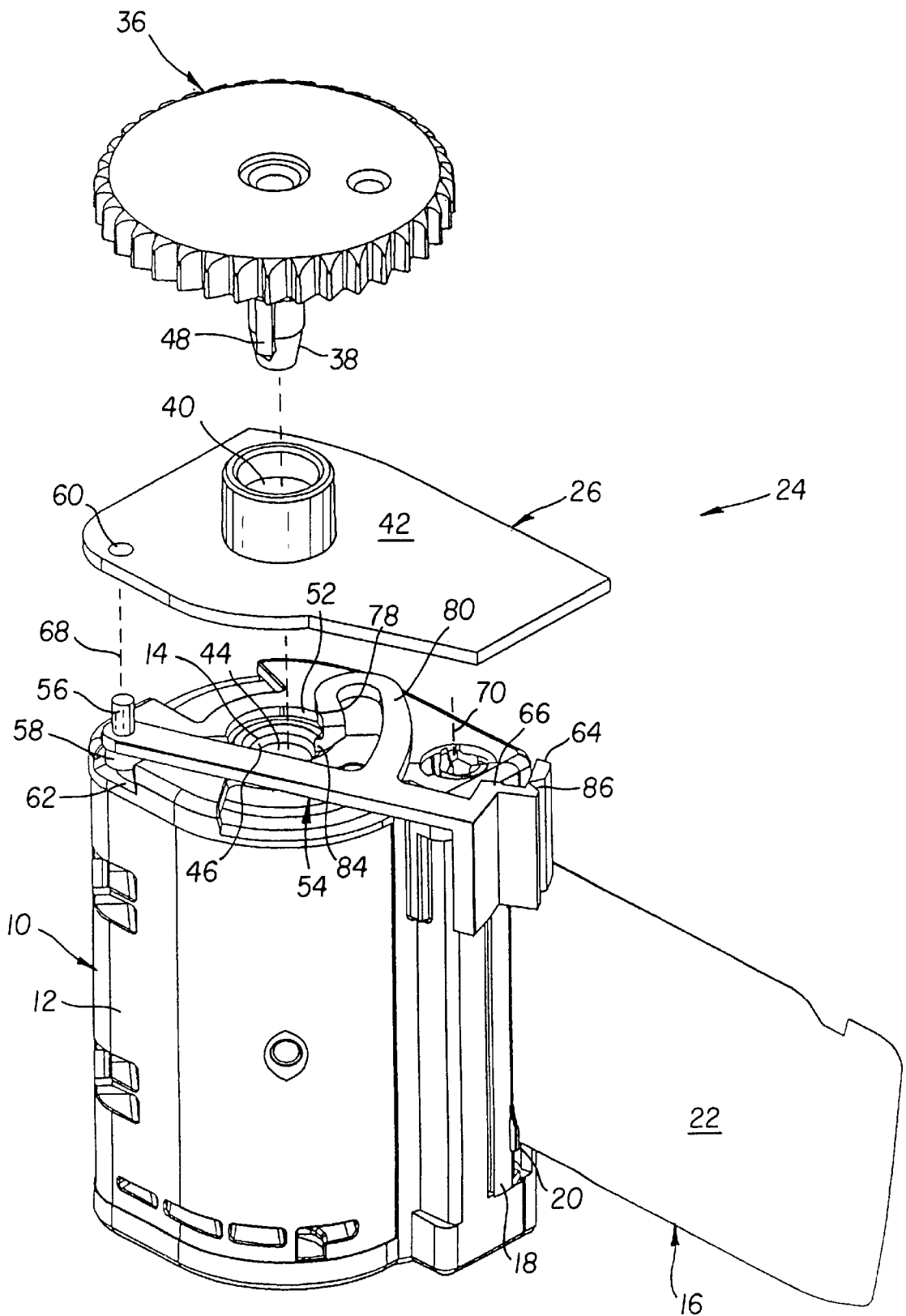
FIG. 3 is a perspective view similar to FIG. 1, showing the camera partially assembled.
Figure 4:
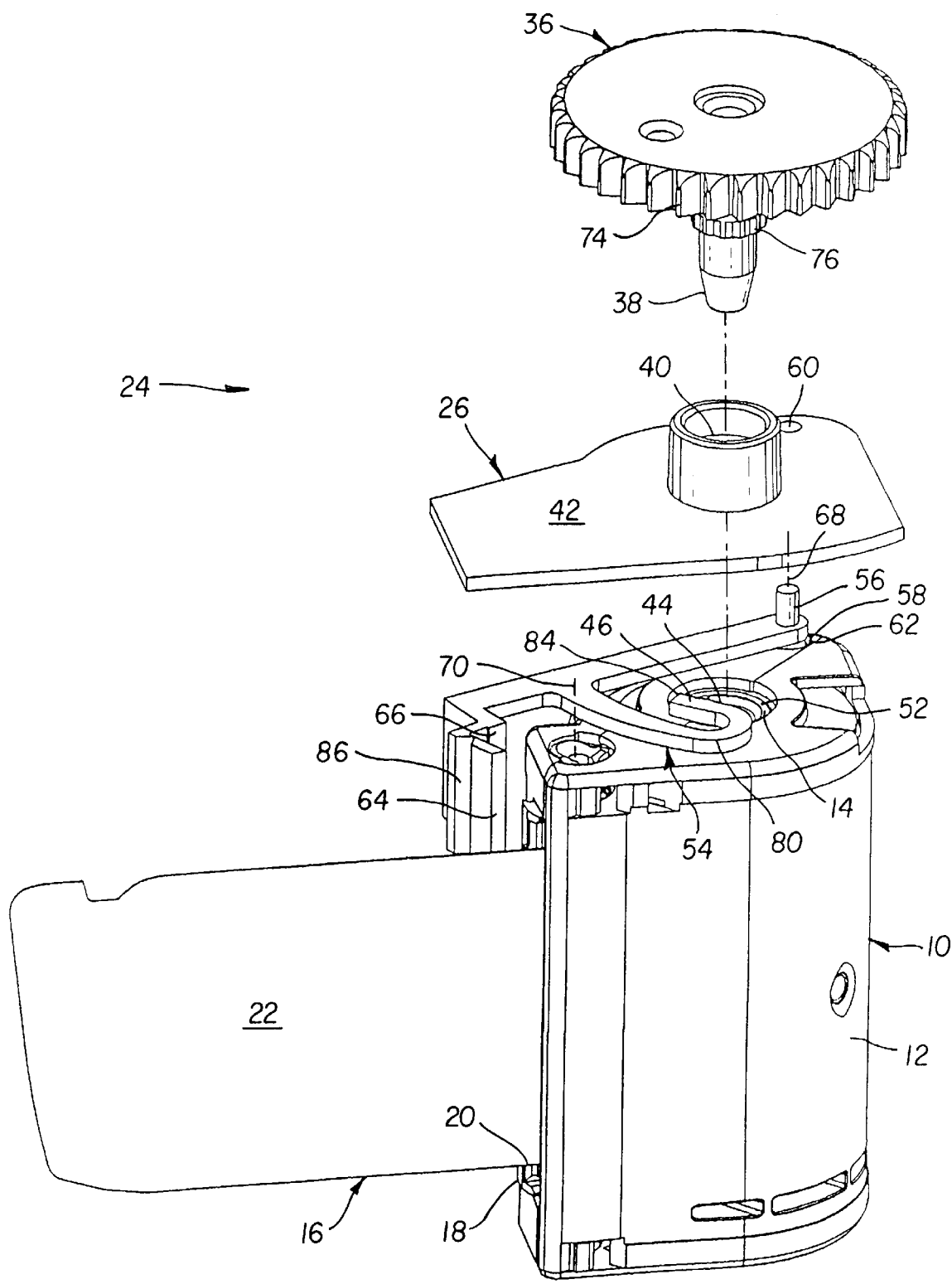
FIG. 4 is a perspective view similar to FIG. 2, showing the camera partially assembled.
Figure 5:
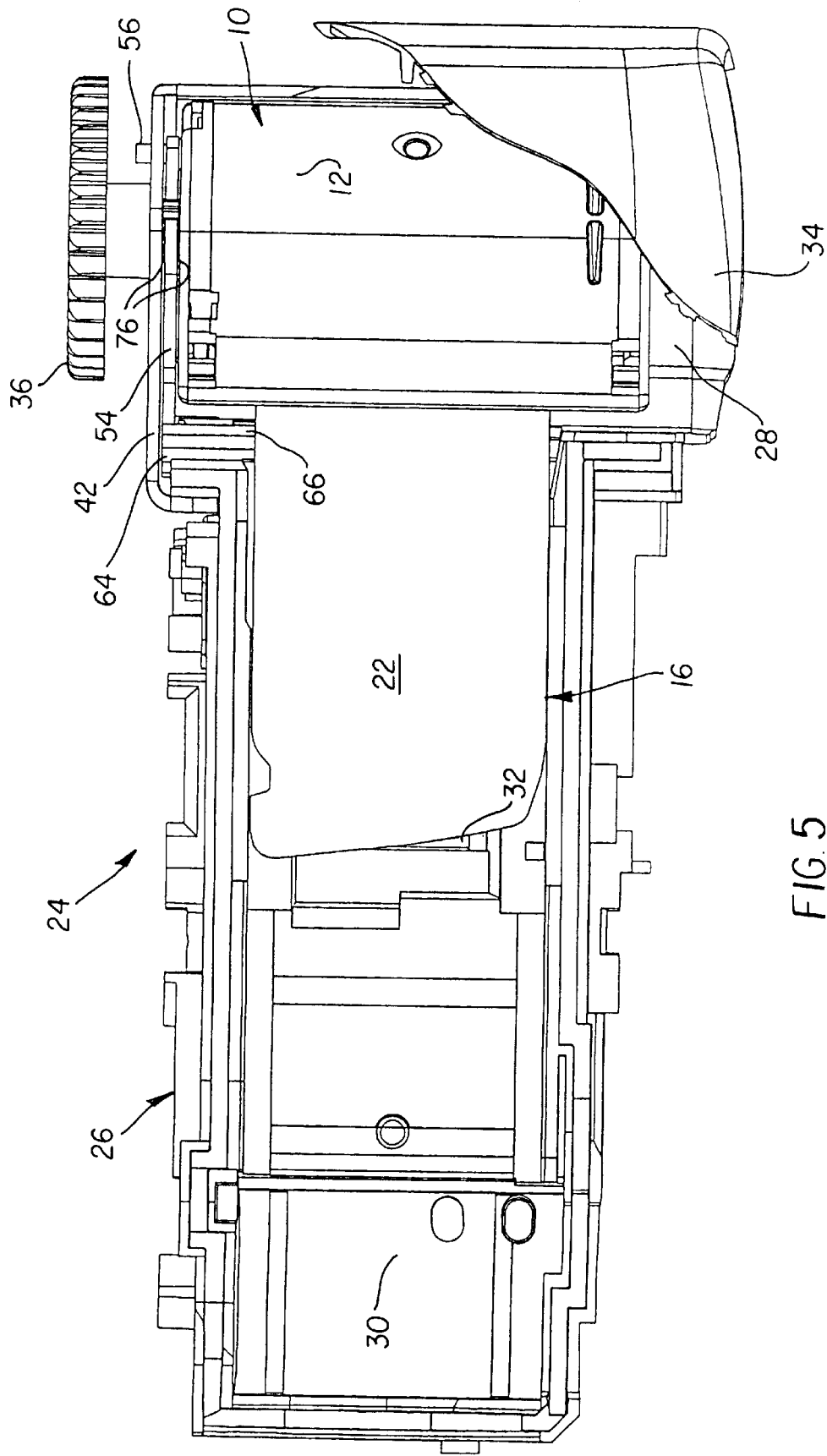
FIG. 5 is a rear elevation view partially of the camera.
Figure 6:
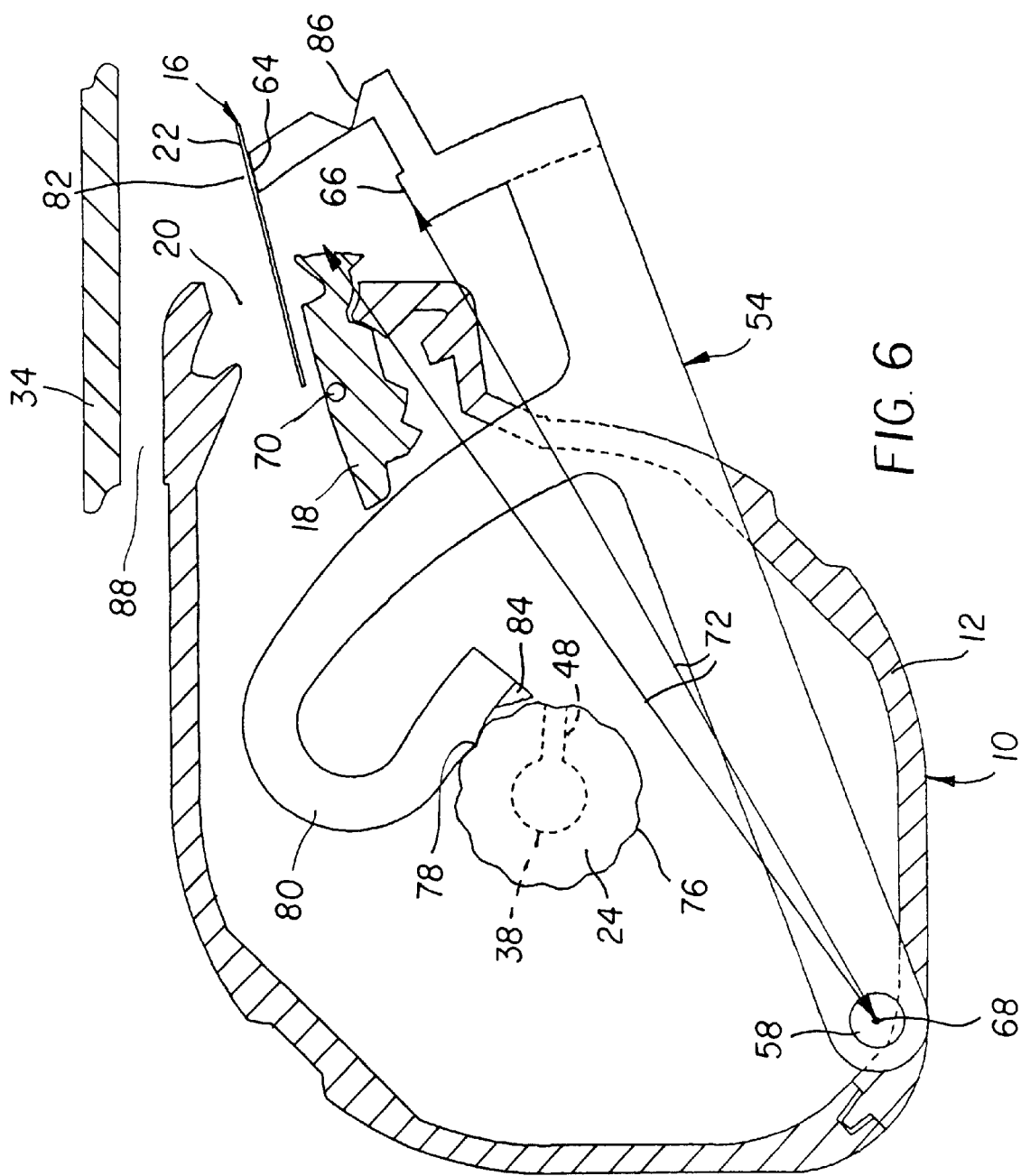
FIG. 6 is a top plan view of a film winder and a film sensing and light lock closing lever in the camera that operate to close the light lock of a film cassette after the film winder has completely wound an exposed filmstrip into the cassette following the last exposure.
Figure 7:
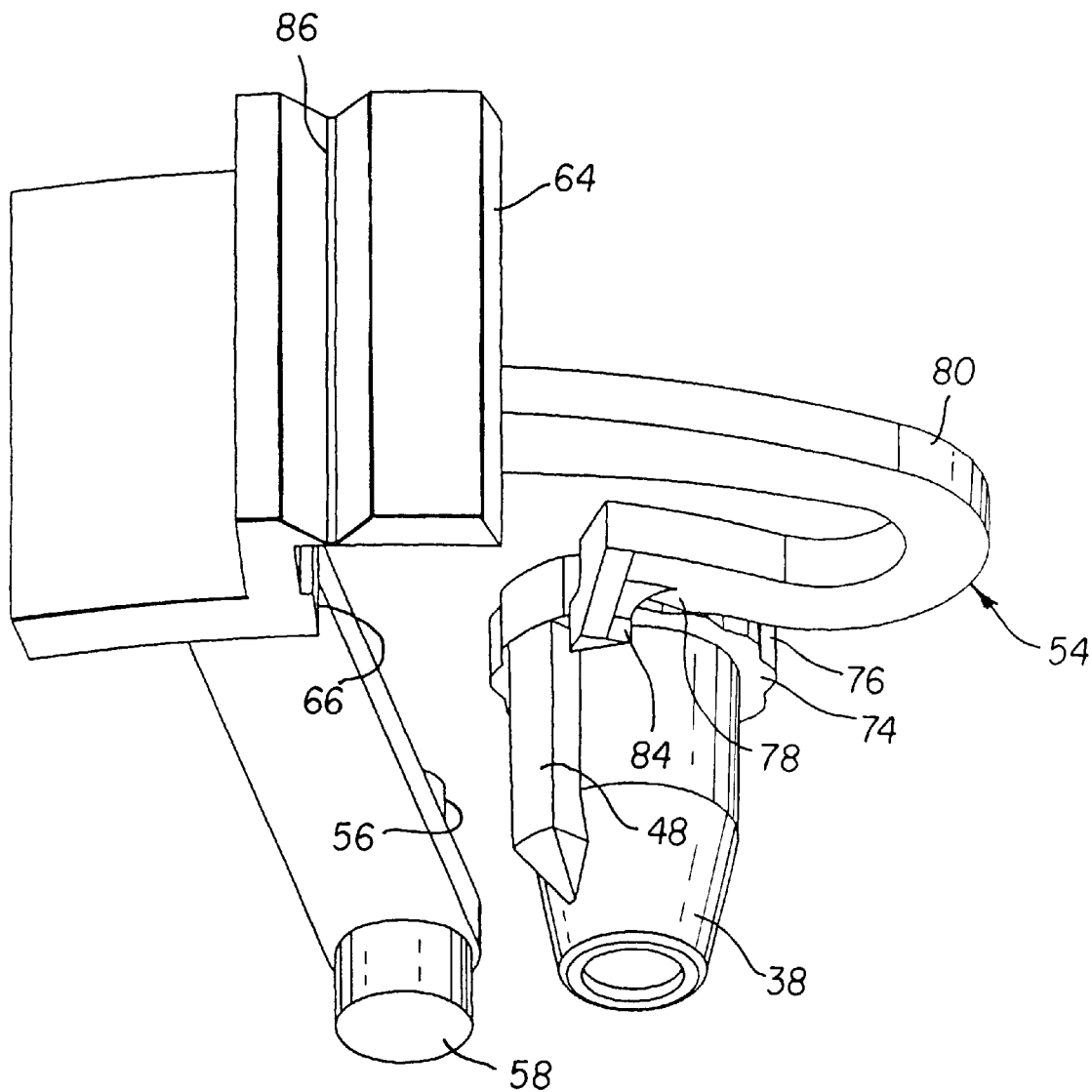
FIG. 7 is a bottom side or end perspective view of the film sensing and light lock closing lever.
Figure 8:
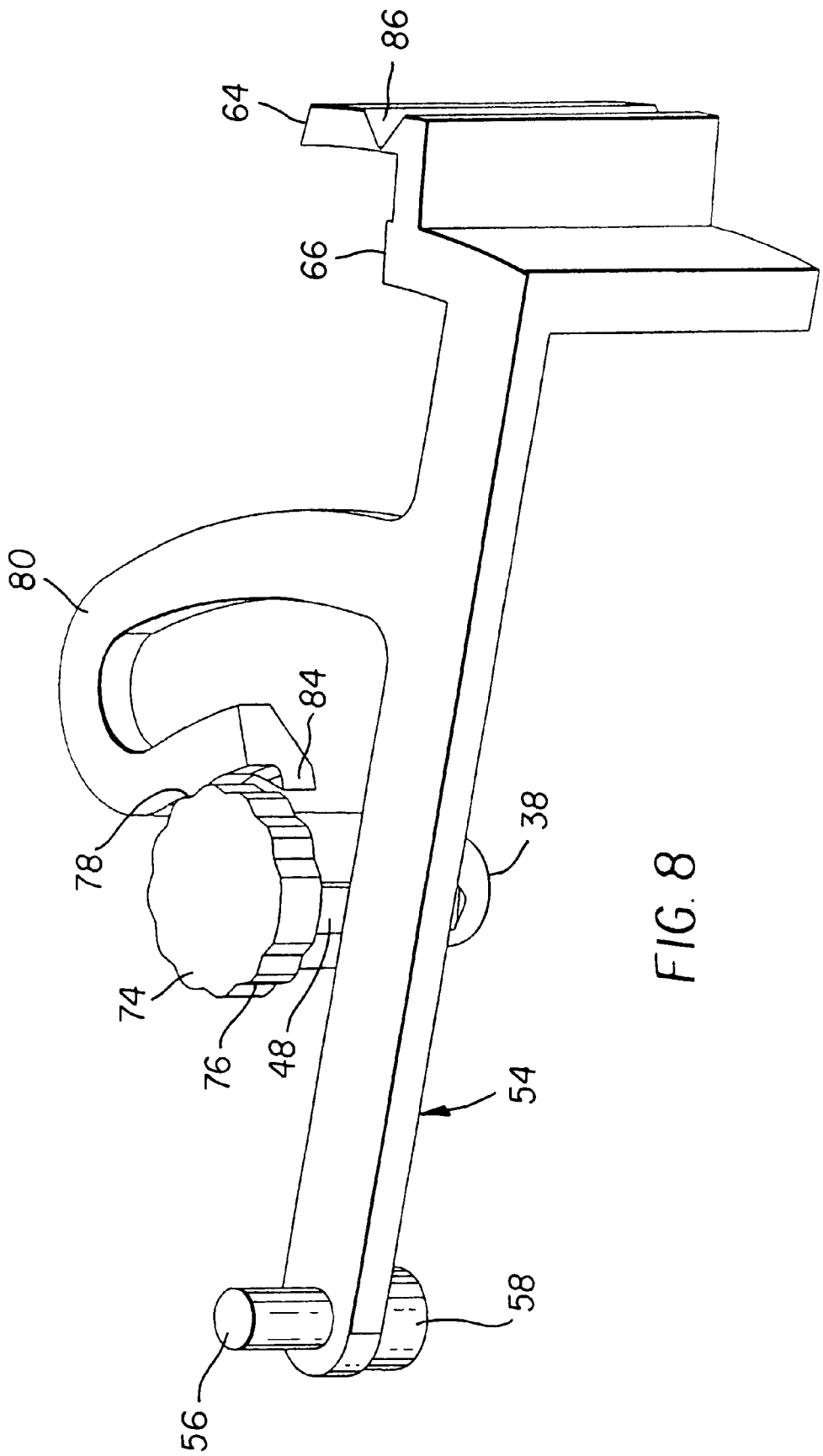
FIG. 8 is a top front perspective view of the film winder and the film sensing and light lock closing lever.
Figure 10:
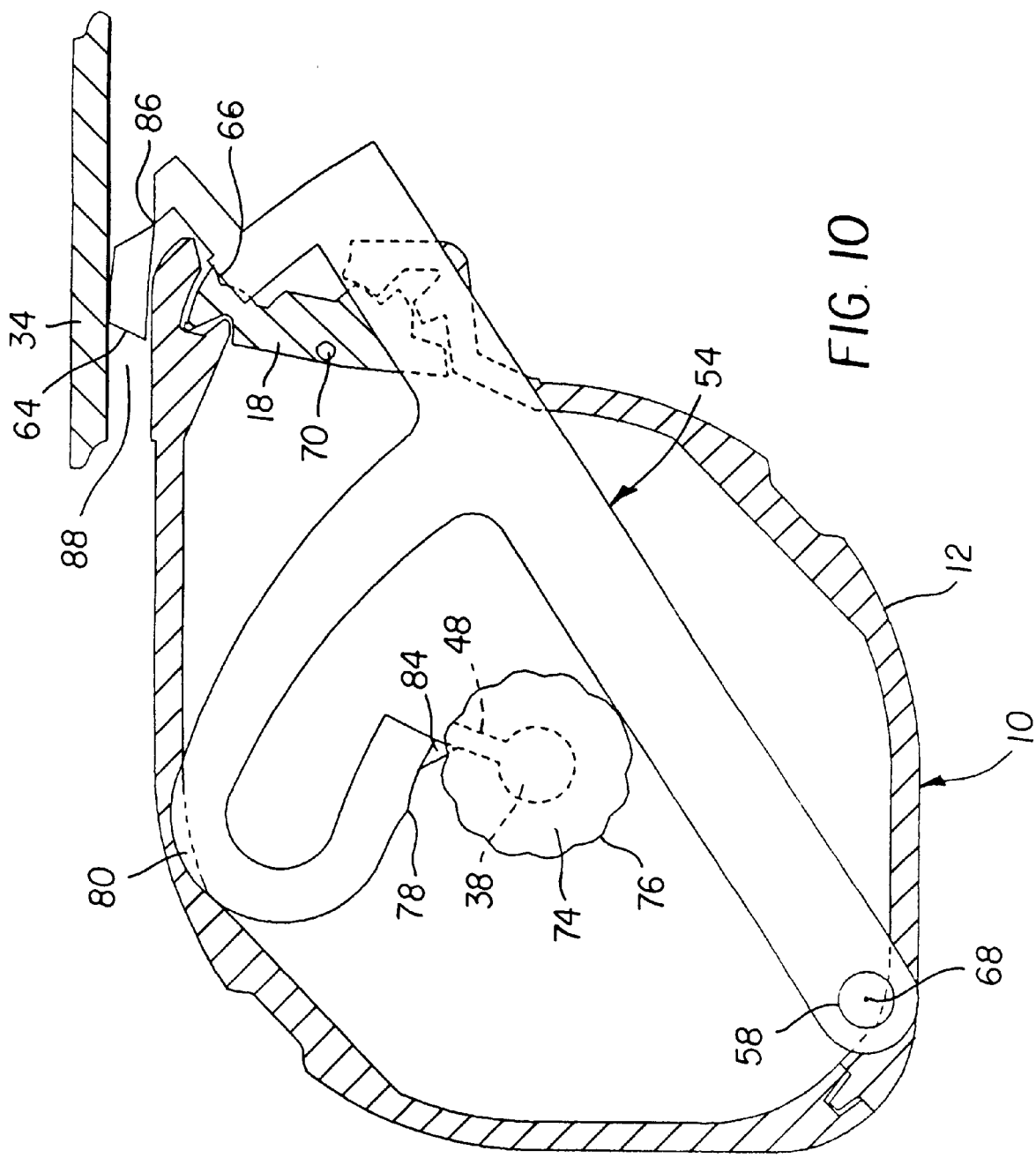

FIGS. 1 and 2 show the film cassette from front and rear sides, respectively, with the light lock 18 pivoted open. The filmstrip 16 except for a trailing film end portion 22 has been wound into the cassette shell 12 after being exposed outside the cassette shell. FIG. 6 shows the light lock 18 open immediately before the trailing film end portion 22 is wound into the cassette shell 12. FIG. 10 shows the light lock 18 pivoted closed immediately after the trailing film end portion 22 is into the cassette shell 12.

One-Time-Use Camera

FIGS. 1–9 partially show a so-called one-time-use or disposable camera 24 with the film cassette 10. The camera 24 includes a main body part 26 having a cassette receiving chamber 28 for the film cassette 10, a film roll chamber 30 in which the filmstrip 16 is originally stored as an unexposed film roll (not shown), and a backframe opening 32 at which successive frames of the filmstrip are exposed. See FIG. 5. After each exposure, the exposed frame is wound onto the film spool 14 inside the cassette shell 12. A rear cover part 34 light-tightly covers the cassette receiving chamber 28, the film roll chamber 30 and the backframe opening 32.

A single-piece, manually rotatable film winder or thumbwheel 36 has a coaxially depending stem 38 that extends through a bearing hole 40 in a top portion 42 of the main body part 26 and into an accessible cavity 44 in a spool core 46 of the film spool 14. The depending stem 38 has a key protuberance 48 that extends radially from and longitudinally along the depending stem to rotationally engage the spool core 46 at a mating slot 50 in the spool core, beginning at an exposed end 52 of the spool core. See FIGS. 1 and 2. The thumbwheel 36 is intended to be manually rotated counter-clockwise in FIGS. 1 and 2 to similarly rotate the film spool 14 in order to wind the filmstrip 16 incrementally onto the film spool following each exposure at the backframe opening 32, and to then wind the trailing film end portion 22 onto the film spool following the last exposure.

As shown in FIGS. 1–10, a single-piece closing lever 54 for pivoting the light lock 18 closed after the trailing film end portion 22 has been wound into the film cassette 10 has a pair of upstanding and depending coaxial pivot pins 56 and 58 that are pivotally supported in a bearing or pivot hole 60 in the top portion 42 of the main body part 26 and in a datum recess or pivot hole 62 in the cassette shell 12. The closing lever 54 has a pair of film sensing and light lock closing edge-surfaces 64 and 66 that are parallel and offset from one another and face generally in the same direction. Both of the film sensing and light lock closing edge-surfaces 64 and 66 are located outside the cassette shell 12 in FIGS. 1–4, 6 and 9. The closing lever 54 is pivotable about an axis 68 that is parallel to an axis 70 of the pivotable light lock 18. The light lock closing edge-surface 66 is spaced from the pivot pin 58 substantially the same distance 72 in FIG. 6 that the pivot hole 62 for the same pin is spaced from the light lock 18.

A collar 74 is arranged on the depending stem 38 of the thumbwheel 36 to extend radially coextensively with the key projection 48 from the depending stem, and it has a continuous array of friction providing peripheral teeth 76. When the thumbwheel 36 is manually rotated counter-clockwise in FIG. 6, the teeth 76 are moved into and out of successive engagement with a single tooth 78 on a resilient curved arm portion 80 of the closing lever 54, adjacent the exposed end 52 of the spool core 46, to slightly pivot the closing lever 54 counter-clockwise about the axis 68 in order to urge the film sensing edge-surface 64 of the closing lever against the filmstrip 16 (including the trailing film end portion 22). The resistance of the filmstrip 16 (including the trailing film end portion 22) at the film sensing edge surface 64 of the closing lever 54 prevents the closing lever from being further pivoted to position the light lock closing edge-surface 66 of the closing lever against the light lock 18 in FIG. 6. This is possible in part because of the ample resilience or elasticity of the resilient curved arm portion 80 of the closing lever 54.

When the thumbwheel 36 is stationary, i.e. not rotated, the teeth 76 on the collar 74 do not operate to urge the film sensing edge-surface 64 of the closing lever 54 against the filmstrip 16. Instead, the film sensing edge-surface 64 merely floats or rests on the filmstrip 16. This is beneficial because the filmstrip 16 will not then be distorted at the backframe opening 32 during exposure.

Figure 9:
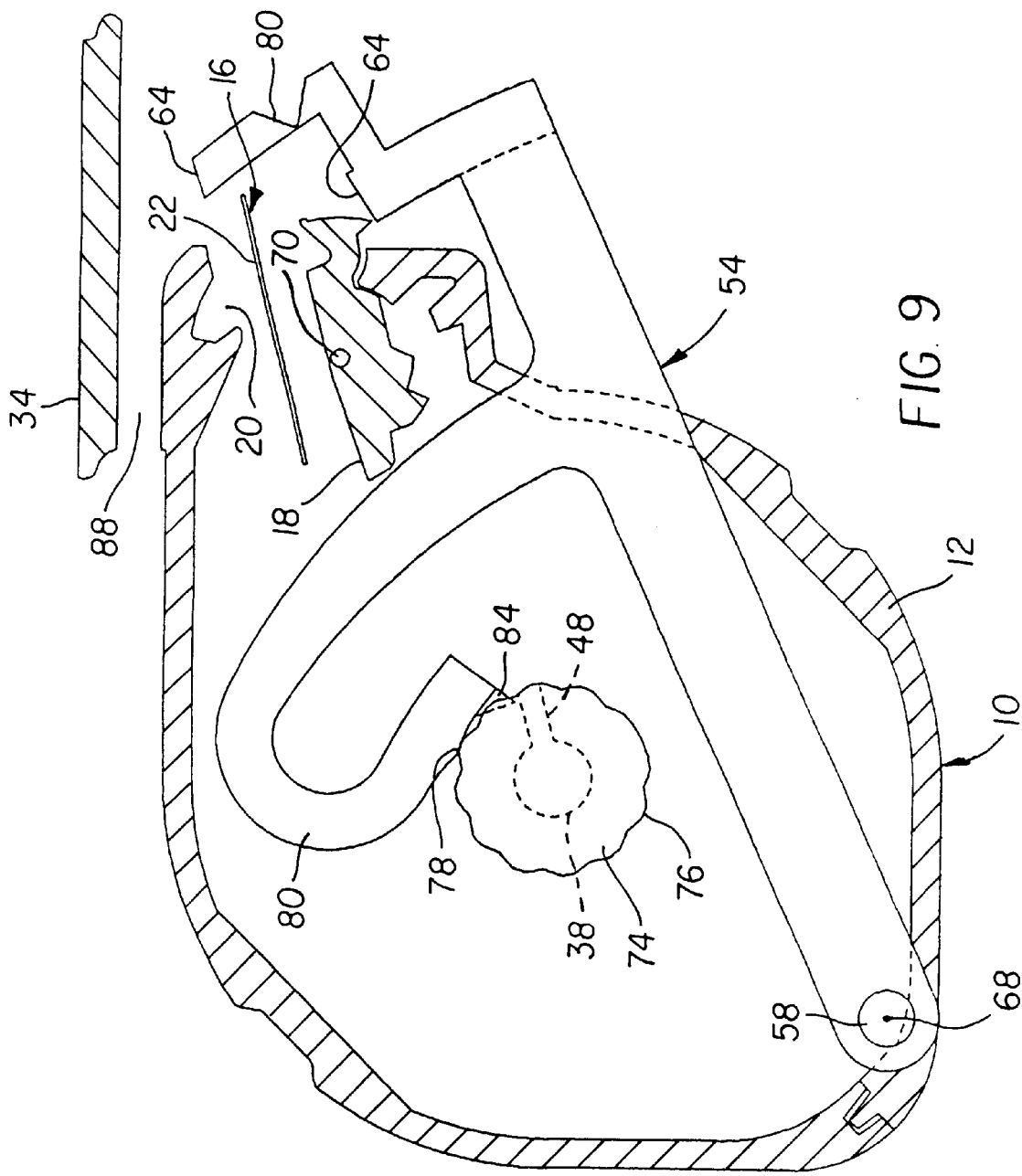
FIGS. 9 and 10 are top plan views of the film winder and the film sensing and light lock closing lever, depicting their operation.

When the filmstrip 16 is completely wound into the cassette shell 12 as shown in FIG. 9, the filmstrip is removed from a space 82 adjacent the film sensing edge-surface 64 of the closing lever 54. Since there is now no resistance of the filmstrip 16 at the film sensing edge-surface 64, when the thumbwheel 36 is manually rotated counter-clockwise in FIG. 9, to move the teeth 76 into and out of successive engagement with the single tooth 78, the closing lever 54 will be slightly pivoted counter-clockwise about the axis to urge the light lock closing edge-surface 66 of the closing lever against the light lock 18 as shown in FIG. 9. The film sensing edge-surface 64 is then positioned in the space 82.

The continued rotation of the thumbwheel 36 counter-clockwise in FIG. 10 moves the key protuberance 48 on the depending stem 38 of the thumbwheel against an end projection 84 on the resilient curved arm portion 80 of the closing lever 54 to pivot the closing lever counter-clockwise about the axis 68. This moves the light lock closing edge-surface 66 of the closing lever 54 from immediately outside the film passageway 20 in FIG. 9 to slightly inside the film passageway in FIG. 10 to pivot the light lock 18 counter-clockwise about the axis 70, which closes the passageway to prevent ambient light from entering the cassette shell 12. The closing lever 54 has a weakened living hinge portion 86 between the film sensing edge-surface 64 and the light lock closing edge-surface 66 which is constructed to allow the film sensing edge-surface to be folded towards the light lock closing edge-surface without becoming separated (broken off) from closing lever. Consequently, the film sensing edge-surface 64 is folded into a capture space 88 between the cassette shell 12 and the rear cover part 34 as shown in FIG. 10. The film sensing edge-surface 64 is then trapped incapacitated in the capture space 88 without becoming separated from the closing lever 54 in order to secure the light lock closing edge-surface 66 in place holding the light lock 18 closed.

It will be appreciated that the key protuberance 48 on the depending stem 38 of the thumbwheel 36 operates as a dual-function part. One function is to rotate the film spool 14. The other function is to pivot the closing lever 54 in order for the light lock closing edge-surface 66 to pivot the light lock 18 closed. Since the collar 74 on the depending stem 38 of the thumbwheel 36 extends radially coextensively with the key protuberance 48 from the depending stem, the collar prevents the key protuberance from engaging the end projection 84 on the resilient curved arm portion 80 of the closing lever 54 before the filmstrip 16 is completely wound into the cassette shell 12. This can be seen by comparing FIGS. 6 and 9.

Methods

The following methods are disclosed in connection with the one-time-use camera 24:

A method of windingly rotating the film spool 14 inside the film cassette 10 to progressively wind the exposed filmstrip 16 into the film cassette and closing the light lock 18 of the film cassette after the exposed filmstrip is completely wound into the film cassette, comprising the steps of:

first windingly rotating the thumbwheel 36 with the key protuberance 48 in engagement with the film spool to windingly rotate the film spool in order to progressively wind the exposed filmstrip into the film cassette; and;

then, after the exposed filmstrip is completely wound into the cassette, windingly rotating the film winder with the key protuberance in engagement with the closing lever 54, at the same time the key protuberance engages the film spool, to pivot the closing lever in order to close the light lock.

A method of windingly rotating the film spool 14 inside the film cassette 10 to progressively wind the exposed filmstrip 16 into the film cassette and closing the light lock 18 of the film cassette after the exposed filmstrip is completely wound into the film cassette, comprising the steps of rotating the thumbwheel 36 to windingly rotate the film spool, urging the film sensing edge-surface 64 of the closing lever 54 against the exposed filmstrip before the exposed filmstrip is completely wound into the film cassette to sense the presence of the exposed filmstrip, and moving the light lock closing edge-surface 66 of the closing lever to close the light lock when the exposed filmstrip is completely wound into the film cassette, is characterized in that:

the film sensing edge-surface is urged against the exposed filmstrip only when the thumbwheel is rotated, whereby the film sensing edge-surface is not urged against the exposed filmstrip when the thumbwheel is stationary.

A method of closing the light lock 18 within the film passageway 20 in the film cassette 10 after the exposed filmstrip 16 is completely moved into the film cassette, comprising the step of:

pivoting the closing lever 54 to swing the light lock closing edge-surface 66 of the closing lever from outside the film passageway to inside the film passageway when the exposed filmstrip is moved completely into the film cassette, in order to close the light lock.

A method of assembling the one-time-use camera 24 comprising the steps of:

loading the film cassette 10 into the camera; and pivotally engaging the closing lever 54 with the film cassette, without the closing lever engaging the light lock 18, in order to support the closing lever on the film cassette for pivotal movement relative to the light lock for the closing lever to be pivoted against the light lock to close the light lock.

The invention has been described with reference to a preferred embodiment. However, it will be appreciated that variations and modifications can be effected by a person of ordinary skill in the art without departing from the scope of the invention.

Parts List 10. film cassette
12. cassette shell
14. film spool
16. filmstrip
18. light lock
20. film passageway
22. trailing film end portion
24. one-time-use camera
26. main body part
28. cassette receiving chamber
30. unexposed film roll chamber
32. backframe opening
34. rear cover part
36. film winder or thumbwheel
38. depending stem
40. bearing hole
42. top portion
44. cavity
46. spool core
48. key protuberance
50. mating slot
52. exposed end
54. closing lever
56. pivot pin
58. pivot pin
60. pivot hole
62. pivot hole
64. film sensing edge-surface
66. light lock closing edge-surface
68. axis
70. axis
72. distance
74. collar
76. teeth
78. tooth
80. resilient curved arm portion
82. space
84. end projection
86. weakened portion
88. capture space

What is claimed is:

1. A camera comprising a chamber for a film cassette having a light lock that is to be closed when an exposed filmstrip is completely moved into the cassette, and a movable closing mechanism for closing the light lock, is characterized in that:

said closing mechanism has a closing lever with a pivot support configured on said closing lever to engage the film cassette separate from the light lock in order to support said closing lever on the film cassette for pivotal movement to close the light lock.

2. A camera as recited in claim 1, wherein said pivot support is a pivot pin adapted to be received in a pivot hole in the film cassette in order for said pivot support to engage the film cassette to support said closing lever.

3. A camera as recited in claim 2, wherein said closing lever has a closing surface that is spaced from said pivot pin substantially the same distance the pivot hole is spaced from the light lock in order for said closing surface to be pivoted against the light lock when said closing lever is pivoted to close the light lock.

4. A camera as recited in claim 2, wherein a main body part of said camera has a pivot hole, and said closing lever has another support coaxial with said pivot pin that is received in said pivot hole in said main body part.

5. A camera comprising a chamber for a film cassette having a light lock that is to be closed when an exposed filmstrip is completely moved into the cassette, and a movable closing mechanism for closing the light lock, is characterized in that:

said closing mechanism has a closing lever with a pivot support configured on said closing lever to engage the film cassette without engaging the light lock in order to support said closing lever on the film cassette for pivotal movement relative to the light lock for said closing lever to be pivoted against the light lock to close the light lock.

6. A camera comprising a chamber for a film cassette having a light lock that is pivotable about an axis to be closed when an exposed filmstrip is completely moved into the cassette, and a movable closing mechanism for closing the light lock, is characterized in that:

said closing mechanism has a closing lever with a pivot support configured on said closing lever to engage the film cassette in order to support said closing lever on the film cassette for pivotal movement about an axis parallel to the axis of the light lock to close the light lock.

7. A one-time-use camera comprising a film cassette having a light lock that is to be closed when a filmstrip exposed in said camera is completely moved into said cassette, and a movable closing mechanism for closing said light lock, is characterized in that:

said film cassette has a pivot support separate from said light lock that can be engaged without engaging said light lock; and said closing mechanism has a closing lever with a pivot support configured on said closing lever to engage said pivot support of said film cassette to support said closing lever on said film cassette for pivotal movement to close said light lock.

8. A method of assembling a one-time-use camera comprising the steps of:

loading into the camera a film cassette having a light lock that is to be closed when a filmstrip exposed in said camera is completely moved into the cassette; and pivotally engaging a closing lever with the film cassette, without the closing lever engaging the light lock, in order to support the closing lever on the film cassette for pivotal movement relative to the light lock for the closing lever to be pivoted against the light lock to close the light lock.

* * * * *